US011129221B2

(12) United States Patent
Lin et al.

(10) Patent No.: US 11,129,221 B2
(45) Date of Patent: Sep. 21, 2021

(54) BLUETOOTH CONNECTION METHOD, DEVICE AND SMART TERMINAL

(71) Applicant: SHENZHEN GRANDSUN ELECTRONIC CO., LTD., Guangdong (CN)

(72) Inventors: Minjie Lin, Shenzhen (CN); Haiquan Wu, Shenzhen (CN); Dejun Jiang, Shenzhen (CN); Enqin Zhang, Shenzhen (CN); Lei Cao, Shenzhen (CN); Ruiwen Shi, Shenzhen (CN)

(73) Assignee: SHENZHEN GRANDSUN ELECTRONIC CO., LTD., Guangdong (CN)

(*) Notice: Subject to any disclaimer, the term of this patent is extended or adjusted under 35 U.S.C. 154(b) by 38 days.

(21) Appl. No.: 16/370,809

(22) Filed: Mar. 29, 2019

(65) Prior Publication Data
US 2019/0306905 A1 Oct. 3, 2019

(30) Foreign Application Priority Data
Mar. 30, 2018 (CN) .......................... 201810294240.5

(51) Int. Cl.
H04W 76/15 (2018.01)
H04W 4/80 (2018.01)
(Continued)

(52) U.S. Cl.
CPC ............ *H04W 76/15* (2018.02); *H04W 4/80* (2018.02); *H04W 76/11* (2018.02); *H04W 76/40* (2018.02);
(Continued)

(58) Field of Classification Search
CPC ..................................... H04W 76/15
(Continued)

(56) References Cited

U.S. PATENT DOCUMENTS 9,681,381 B2    6/2017  Kang
2014/0323048 A1  10/2014  Kang
(Continued)

FOREIGN PATENT DOCUMENTS

CN    104144470 A    3/2014
CN    104467925 A    12/2014
(Continued)

OTHER PUBLICATIONS

BLE connection procedures from https://www.rfwireless-world.com/Terminology/BLE-Connection-Establishment-Procedure.html (Year: 2014).*

*Primary Examiner* — Peter G Solinsky
(74) *Attorney, Agent, or Firm* — Loza & Loza, LLP; Michael F. Fedrick

(57) ABSTRACT

The present application is applicable to the field of smart terminal technologies, and a Bluetooth connection method and device and a smart terminal are provided. The method includes: searching, by a terminal device, for a dual-mode Bluetooth device and establishing a connection relationship in a first Bluetooth mode with the dual-mode Bluetooth device; obtaining identification information of the dual-mode Bluetooth device; and establishing a connection relationship in a second Bluetooth mode with the dual-mode Bluetooth device according to the identification information.

20 Claims, 4 Drawing Sheets

(51) Int. Cl.
*H04W 76/11* (2018.01)
*H04W 76/40* (2018.01)
*H04W 88/06* (2009.01)
*H04W 8/00* (2009.01)

(52) U.S. Cl.
CPC ............ *H04W 88/06* (2013.01); *H04W 8/005* (2013.01); *Y02D 30/70* (2020.08)

(58) Field of Classification Search
USPC ........................................................ 370/329
See application file for complete search history.

(56) References Cited

U.S. PATENT DOCUMENTS

| | | |
|---|---|---|
| 2014/0342670 A1 | 11/2014 | Kang et al. |
| 2015/0126117 A1 | 5/2015 | Wong et al. |
| 2016/0128124 A1 | 5/2016 | Liu et al. |
| 2016/0157078 A1 | 6/2016 | Palin et al. |
| 2016/0165380 A1* | 6/2016 | Kwan ............... H04W 52/0251 455/41.1 |
| 2016/0198290 A1 | 7/2016 | Hong et al. |
| 2018/0103499 A1* | 4/2018 | Lee ....................... H04W 76/15 |
| 2019/0150215 A1* | 5/2019 | Li ......................... H04W 76/16 370/329 |
| 2019/0342933 A1* | 11/2019 | Li ........................... H04W 4/06 |
| 2019/0393932 A1* | 12/2019 | Hsu ....................... H04W 80/02 |

FOREIGN PATENT DOCUMENTS

| | | |
|---|---|---|
| CN | 104539325 A | 12/2014 |
| CN | 104540090 A | 12/2014 |
| CN | 105050033 A | 7/2015 |
| CN | 106131810 A | 6/2016 |
| CN | 107277754 A | 7/2017 |

* cited by examiner

BLUETOOTH CONNECTION METHOD, DEVICE AND SMART TERMINAL

CROSS REFERENCE

This application claims priority to Chinese Patent Application No. 201810294240.5, filed on Mar. 30, 2018, entitled "BLUETOOTH CONNECTION METHOD, DEVICE AND SMART TERMINAL", which is hereby incorporated by reference into this application as if fully set forth herein.

TECHNICAL FIELD

This application relates to the field of smart terminal technology, more particularly, it relates to Bluetooth connection method, device and smart terminal.

BACKGROUND

The dual-mode Bluetooth device is a device that supports both classic Bluetooth and Bluetooth Low Energy. When other terminal establishes a Bluetooth connection with a dual-mode Bluetooth device, a classic Bluetooth connection and a Bluetooth Low Energy connection may be established simultaneously. The two different modes of the Bluetooth connection are independent relatively. But when a terminal needs to be connected with a dual-mode Bluetooth device with both classic Bluetooth connection and Bluetooth Low Energy connection simultaneously, there may be a misconnection due to the openness of the Bluetooth connection. That means this terminal may find and is connected to other Bluetooth devices including classic Bluetooth devices and Bluetooth Low Energy devices, and meanwhile the dual-mode Bluetooth device may be found and connected by other terminals.

For example, the terminal A needs to perform classic Bluetooth connection and Bluetooth Low Energy connection with the dual-mode Bluetooth device A, however after the two devices enables Bluetooth mode, terminal A establishes classic Bluetooth connection with the dual-mode Bluetooth device A, but establishes Bluetooth Low Energy connection with another Bluetooth device B (as shown in FIG. 1), or other misconnections may occur.

SUMMARY

In view of this, according to an embodiment of the present application, a Bluetooth connection method, a device, and a smart terminal are provided, to solve the problem that misconnection may easily occur when the terminal establishes connections of two modes with the dual-mode Bluetooth device.

According to a first aspect of the embodiment of the present application, a Bluetooth connection method is provided, which includes:

Searching, by a terminal device, for a dual-mode Bluetooth device and establishing a connection relationship in a first Bluetooth mode connection with the dual-mode Bluetooth device;

obtaining identification information of the dual-mode Bluetooth device; and establishing a connection relationship in a second Bluetooth mode with the dual-mode Bluetooth device according to the identification information, wherein the first Bluetooth mode is one of a classic Bluetooth mode and a Bluetooth Low Energy mode of the dual-mode Bluetooth device, and the second Bluetooth mode is the other one of the classic Bluetooth mode and the Bluetooth Low Energy mode of the dual-mode Bluetooth device.

According to a second aspect of the embodiment of the present application, a Bluetooth connection method is provided, which includes:

establishing, by a dual-mode device, a connection relationship in a first Bluetooth mode with a terminal device after a Bluetooth mode is enabled;

sending identification information of the dual-mode Bluetooth device to the terminal device; and instructing the terminal device to establish a connection relationship in the second Bluetooth mode with the dual-mode Bluetooth device according to the identification information, wherein the first Bluetooth mode is one of a classic Bluetooth mode and a Bluetooth Low Energy mode of the dual-mode Bluetooth device, and the second Bluetooth mode is the other one of the classic Bluetooth mode and the Bluetooth Low Energy mode of the dual-mode Bluetooth device.

According to a third aspect of the embodiment of the present application, a Bluetooth connection device is provided. The Bluetooth connection device includes a terminal device and a dual-mode Bluetooth device, where the terminal device includes:

a first connection module, configured to make the terminal device search for a dual-mode Bluetooth device and establish a connection relationship in a first Bluetooth mode with the dual-mode Bluetooth device;

an obtaining module, configured to obtain identification information of the dual-mode Bluetooth device; and a second connection module, configured to establish a connection relationship in a second Bluetooth mode with the dual-mode Bluetooth device according to the identification information, where the first Bluetooth mode is one of a classic Bluetooth mode and a Bluetooth Low Energy mode of the dual-mode Bluetooth device, and the second Bluetooth mode is the other one of the classic Bluetooth mode and the Bluetooth Low Energy mode of the dual-mode Bluetooth device; and the dual-mode Bluetooth device includes:

a Bluetooth mode enabling module, configured to enable the dual-mode Bluetooth device to establish the connection relationship in the first Bluetooth mode with the terminal device after a Bluetooth mode is enabled;

a sending module, configured to send the identification information of the dual-mode Bluetooth device to the terminal device; and an instructing module, configured to instructing the terminal device to establish the connection relationship in the second Bluetooth mode with the dual-mode Bluetooth device according to the identified information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

According to a fourth aspect of the embodiment of the present application, a Bluetooth connection device is provided, which includes a memory, a processor, and a computer program stored in the memory and executable on the processor, where the processor is configured to execute the computer program to implement steps of the method according to any one of the Bluetooth connection methods.

According to a fifth aspect of the embodiment of the present application, a computer readable storage medium with a computer program stored therein, where the computer program is configured to implement steps of the method according to any one of the Bluetooth connection methods when executed by the processor.

According to the embodiment of the present application, when the terminal device needs to establish a classic Bluetooth connection and a Bluetooth Low Energy connection with the dual-mode Bluetooth device respectively, the terminal device firstly searches for the dual-mode Bluetooth device and establishes the connection of the first Bluetooth mode with the dual-mode Bluetooth device, then obtains the identification information of the connected dual-mode Bluetooth device, and establishes the connection relationship in the second Bluetooth mode according to the identification information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device. In the process, after the connection relationship in the first Bluetooth mode is established between the terminal device and the dual-mode Bluetooth device, the terminal device can accurately determines, according to the identification information of the connected dual-mode Bluetooth device, the relative information of the second Bluetooth mode which is enabled by the connected dual-mode Bluetooth device among many devices with the second Bluetooth mode enabled, thus two connections of different Bluetooth modes with the same dual-mode Bluetooth device are established and the misconnection can be avoided in the connection process.

BRIEF DESCRIPTION OF THE DRAWINGS

In order to more clearly illustrate the technical solution of the embodiment in this application, the drawings which are needed to be used in the description of the embodiments or the prior art are briefly described. Obviously, the drawings in the following description are only some embodiments of the present application. The one skilled in this art can obtain other drawings according to these drawings without creative efforts.

DESCRIPTION OF THE EMBODIMENTS

In the following description, in order to describe but not intended to limit, concrete details such as specific system structure, technique, and so on are proposed, thereby facilitating comprehensive understanding of the embodiments of the present application. However, it will be apparent to the ordinarily skilled one in the art that, the present application can also be implemented in some other embodiments without these concrete details. In some other conditions, detailed explanations of method, circuit, device and system well known to the public are omitted, so that unnecessary details can be prevented from obstructing the description of the present application.

According to the embodiments of the present application, when the terminal device needs to establish a connection relationship in a classic Bluetooth and a connection relationship in a Bluetooth Low Energy with the dual-mode Bluetooth device respectively, the terminal device searches for the dual-mode Bluetooth device and establishes the connection of a first Bluetooth mode with the dual-mode Bluetooth device, then obtains the identification information of the connected dual-mode Bluetooth device, and establishes a connection relationship in the second Bluetooth mode with the dual-mode Bluetooth device according to the identification information, where the first Bluetooth mode includes a classic Bluetooth mode or a Bluetooth Low Energy mode, and the second Bluetooth mode correspondingly includes a Bluetooth Low Energy mode or a classic Bluetooth mode.

In order to explain the technical solutions described in the present application, the following description will be made by way of specific embodiments.

Embodiment 1

Figure 1:
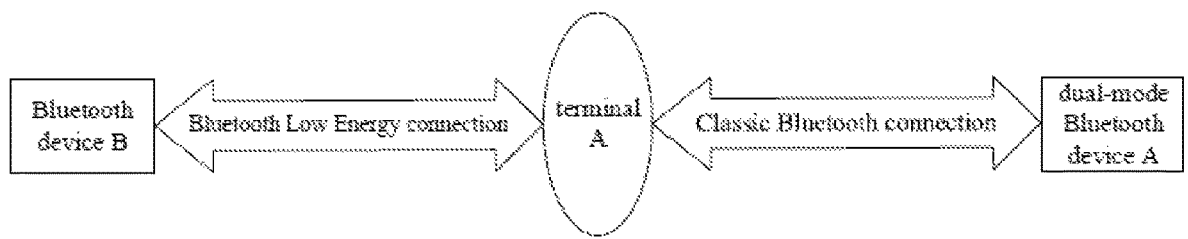
FIG. 1 is a schematic diagram showing a misconnection between a terminal device and a dual-mode Bluetooth device according to an embodiment of the present application.
Figure 2:
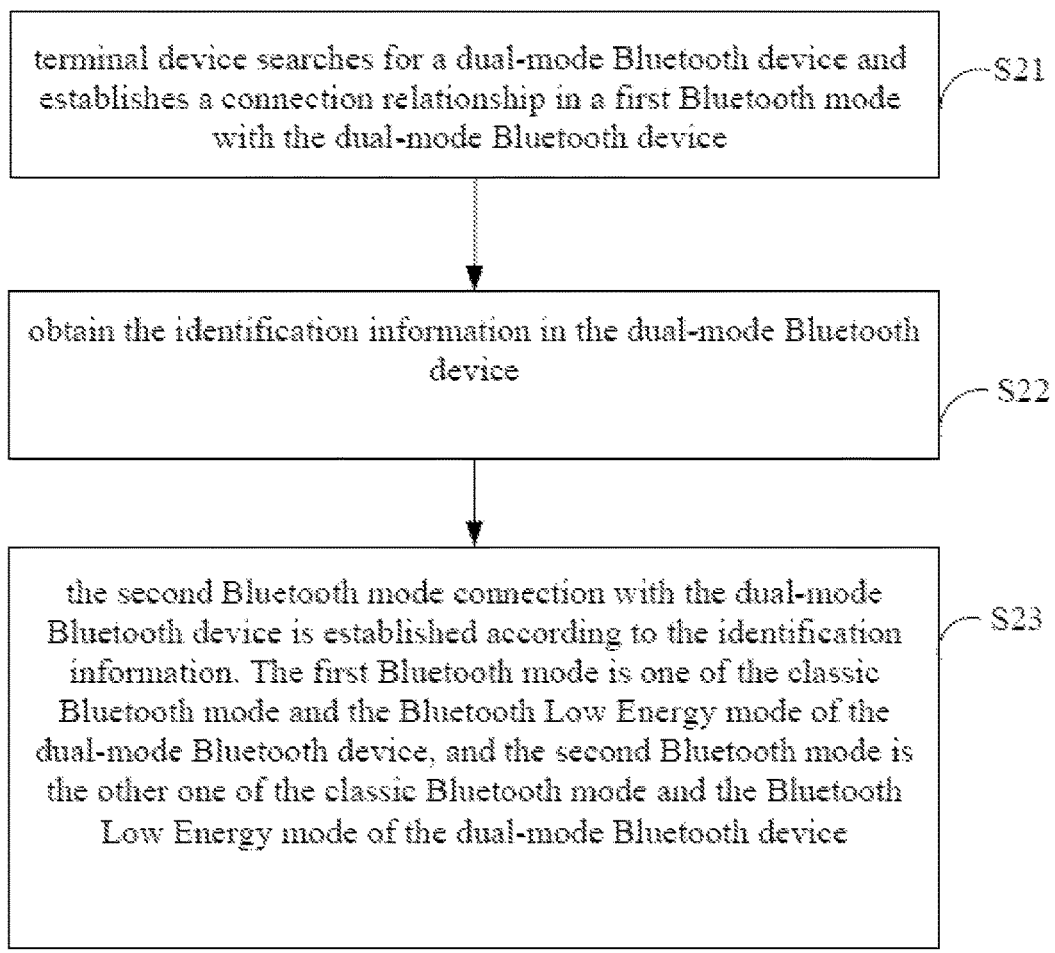
FIG. 2 is a schematic flowchart of a Bluetooth connection method according to the embodiment 1 of the present application.

FIG. 2 is a schematic flowchart of a Bluetooth connection method according to the embodiment 1 of the present application, the detailed description is as follows.

In Step S21, the terminal device searches for a dual-mode Bluetooth device and establishes a connection relationship in a first Bluetooth mode with the dual-mode Bluetooth device;

In an embodiment of the present application the terminal device searches a dual-mode Bluetooth device with the Bluetooth mode enabled within a certain range, and establishes a connection of the first Bluetooth mode according to the Bluetooth mode that the dual-mode Bluetooth device enables.

The first Bluetooth mode includes a classic Bluetooth mode or a Bluetooth Low Energy mode. That is, the Bluetooth mode currently enabled by the dual-mode Bluetooth device may be either the classic Bluetooth mode or the Bluetooth Low Energy mode. The terminal devices include smart phone, iPad, iPod, personal digital assistant (PDA) and so on; the dual-mode Bluetooth devices include smart wearable device (such as a smart wristband), heart rate detector and so on.

In Step S22, the identification information of the dual-mode Bluetooth device is obtained; In this step, after the first Bluetooth mode connection between the terminal device and the dual-mode Bluetooth device is established, the identification information of the connected dual-mode Bluetooth device is obtained. The identification information refers to information forming a unique identifier for the dual-mode Bluetooth device, such as the name of the dual mode Bluetooth device or/and the classic Bluetooth address of the dual mode Bluetooth device when the dual mode Bluetooth device is under the classic Bluetooth mode, and so on.

Optionally, according to another embodiment of the present application, the step of obtaining the identification information of the dual-mode Bluetooth device includes:

obtaining a broadcast packet sent from the dual-mode Bluetooth device in the Bluetooth Low Energy mode; and obtaining identification information of the dual-mode Bluetooth device according to the broadcast packet.

In this step, the dual-mode Bluetooth device will send out a broadcast packet with the identification information of the dual-mode Bluetooth device of the dual-mode Bluetooth device being added after the Bluetooth Low Energy mode is enabled, and the terminal device will obtain the identification information of the dual-mode Bluetooth device simultaneously when the broadcast packet is obtained.

Step S23, the second Bluetooth mode connection with the dual-mode Bluetooth device is established according to the identification information. The first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

According to the Bluetooth connection method of the embodiment of the present application, the terminal device searches for the second Bluetooth mode that is enabled by the dual-mode Bluetooth device according to the identification information of the dual-mode Bluetooth device, and establishes a connection with the dual-mode Bluetooth device. In this process, if the first Bluetooth mode is the classic Bluetooth mode the second Bluetooth mode is the Bluetooth Low Energy mode; accordingly if the first Bluetooth mode is the Bluetooth Low Energy mode the second Bluetooth mode is the classic Bluetooth mode correspondingly.

According to the embodiment of the present application, when the terminal device needs to establish a classic Bluetooth connection and a Bluetooth Low Energy connection with the dual-mode Bluetooth device respectively, the terminal device firstly searches for the dual-mode Bluetooth device and establishes the connection of the first Bluetooth mode with the dual-mode Bluetooth device, then obtains the identification information of the connected dual-mode Bluetooth device, and establishes the connection relationship in the second Bluetooth mode according to the identification information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device. In the process, after the connection relationship in the first Bluetooth mode is established between the terminal device and the dual-mode Bluetooth device, the terminal device can accurately determines, according to the identification information of the connected dual-mode Bluetooth device, the relative information of the second Bluetooth mode which is enabled by the connected dual-mode Bluetooth device among many devices with the second Bluetooth mode enabled, thus two connections of different Bluetooth modes with the same dual-mode Bluetooth device are established and the misconnection can be avoided in the connection process.

Optionally, according to another embodiment of the present application, when the first Bluetooth mode is the classic Bluetooth mode, the step of establishing the connection relationship in the second Bluetooth mode with the dual-mode Bluetooth device according to the identification information includes:

searching for, among dual-mode Bluetooth devices with the Bluetooth Low Energy mode enabled, the dual-mode Bluetooth device having the same identification information as the identification information acquired according to the broadcast packet as the determined dual-mode Bluetooth device; and establishing the connection relationship in the Bluetooth Low Energy mode with the dual-mode Bluetooth device.

In this step, if the terminal device firstly establishes the classic Bluetooth mode connection with the dual-mode Bluetooth device, when establishing the Bluetooth Low Energy mode connection with the dual-mode Bluetooth device, the terminal device firstly searches for the identification information of the dual-mode Bluetooth device according to the connected classic Bluetooth in the connection mode, then searches for, among the dual-mode Bluetooth devices with the Bluetooth Low Energy mode enabled, the dual-mode Bluetooth device having the same identification information as the identification information acquired according to the broadcast packet, then the Bluetooth Low Energy mode connection is established between the terminal device and the dual-mode Bluetooth device.

For example, when the dual-mode Bluetooth device is a heart rate Bluetooth headset (abbreviated as headset) and the terminal device is a smart phone, the headset not only supports the classic Bluetooth (such as phone or music playback function), but also supports the Bluetooth Low Energy protocol for heart rate transmission.

After the Bluetooth headset is turned on the headset is in the being-searched state of the classic Bluetooth mode; in the Bluetooth menu of the smart phone the Bluetooth devices with the classic Bluetooth mode enabled within a certain range are searched for, and when the headset is searched the classic Bluetooth connection with the headset is established. Then the headset is in the being-searched state of the low-power mode by transmitting the broadcast packet of Bluetooth Low Energy (BLE) with the classic Bluetooth address of the headset being added; the heart rate APP of the smart phone searches for the devices with the Bluetooth Low Energy mode enabled within a certain range to find the headset and obtain the classic Bluetooth address of the headset added in the broadcast packet.

The heart rate APP of the smart phone obtains the address of the classic Bluetooth device with a connection established and matches this address with the address in the broadcast packet, if the addresses are matched the APP initiates a connection to the searched Bluetooth Low Energy device, which is exactly the dual-mode Bluetooth device with the classic Bluetooth mode connection having been established, then two Bluetooth mode connections are established between the smart phone and the headset.

Optionally, in another embodiment according to the present application, when the first Bluetooth mode is the low-power mode, the step of establishing the connection relationship in the second Bluetooth mode with the dual-mode Bluetooth device according to the identification information includes:

searching for, among dual-mode Bluetooth devices with the classic Bluetooth mode enabled, the dual-mode Bluetooth device having the same identification information as the identification information acquired according to the broadcast packet as the determined dual-mode Bluetooth device; and establishing the connection relationship in the classic Bluetooth mode with the dual-mode Bluetooth device.

The above process will be explained by taking the case that the terminal device is a smart phone and the dual-mode Bluetooth device is a heart rate Bluetooth headset as a specific example.

The headset is turned on so that the head set is in the being-searched state of the Bluetooth Low Energy mode by transmitting the broadcast packet of Bluetooth Low Energy (BLE) with the classic Bluetooth address of the headset being added; after establishing the Bluetooth Low Energy mode connection with the headset, the smart phone obtains the classic Bluetooth address of the headset.

The heart rate APP of the smart phone shows the name of the connected Bluetooth Low Energy devices, searches for, according to the classic Bluetooth address in the broadcast packet, the smart terminal having the same classic Bluetooth address in the broadcast packet in the Bluetooth menu of the smart phone, thereby finding the headset, then determines and selects the classic Bluetooth device, which is the classic Bluetooth of the dual-mode Bluetooth device, according to the name of the device in the Bluetooth Low Energy connection and the obtained classic Bluetooth address in the broadcast packet, and initiates a classic Bluetooth connection to finally establish the two Bluetooth mode connections between the smart phone and the headset.

According to the embodiment of the present application, after the terminal device establishes the connection with the dual-mode Bluetooth device in one of the Bluetooth modes of the dual-mode Bluetooth device, according to the received identification information the application of the terminal device can automatically establishes the connection with the dual-mode Bluetooth device in the other one of the Bluetooth modes of the dual-mode Bluetooth device and it is guaranteed that it will not be connected to other nearby devices.

Embodiment 2

Figure 3:
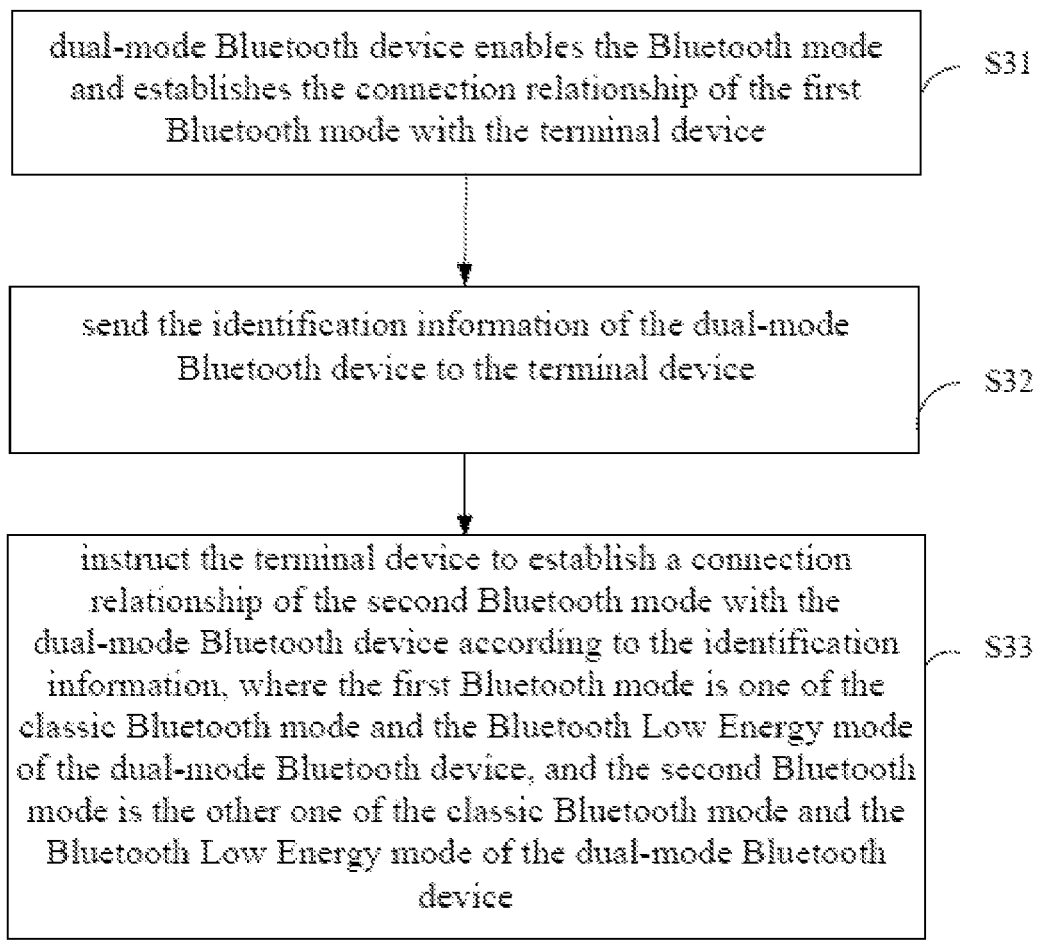
FIG. 3 is a schematic flowchart of a Bluetooth connection method according to the embodiment 2 of the present application.

Corresponding to the Bluetooth connection method described in the above embodiment, FIG. 3 shows a Bluetooth connection method according to another embodiment of the present application, which includes S31 to S33.

In Step S31, the dual-mode Bluetooth device enables the Bluetooth mode and establishes the connection relationship in the first Bluetooth mode with the terminal device;

In the embodiment provided by the present application, after the dual-mode Bluetooth device enables the Bluetooth mode, the terminal device searches for the existing Bluetooth devices within a certain range and establishes the connection of the first Bluetooth mode with the dual-mode Bluetooth device.

The first Bluetooth mode includes a classic Bluetooth mode or a Bluetooth Low Energy mode. That is, the Bluetooth mode currently enabled by the dual-mode Bluetooth device may be either the classic Bluetooth mode or the Bluetooth Low Energy mode. The terminal device include smart phone, iPad, iPod, personal digital assistant (PDA) and so on; the dual-mode Bluetooth device includes smart wearable device (such as a smart wristband), heart rate detector and so on.

In Step S32, the identification information of the dual-mode Bluetooth device is sent to the terminal device.

In this step the dual-mode Bluetooth device sends its own identification information to the terminal device, for the detailed implementation the reference can be made to the Embodiment 1 and it will not be described repeatedly here.

In Step S33, the terminal device is instructed to establish a connection relationship in the second Bluetooth mode with the dual-mode Bluetooth device according to the identification information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

According to the embodiment of the present application, after the terminal device receives the identification information of the dual-mode Bluetooth device, the identification information is compared and judged according to the instructions so as to ensure that the dual-mode Bluetooth device that the established connection of the second Bluetooth mode is connected with is the same one that the connection of the first Bluetooth mode is connected with.

The Bluetooth connection method according to this embodiment corresponds to the specific implementation process of the Embodiment 1 and will not be repeatedly described. In this embodiment, after the connection relationship in the first Bluetooth mode between the terminal device and the dual-mode Bluetooth device is established, the terminal device can accurately determines, according to the identification information of the connected dual-mode Bluetooth device, the relative information of the second Bluetooth mode which is enabled by the connected dual-mode Bluetooth device among many devices with the second Bluetooth mode enabled, thus two connections of different Bluetooth modes with the same dual-mode Bluetooth device are established and the misconnection in the connection process can be avoided.

Embodiment 3

Figure 4:
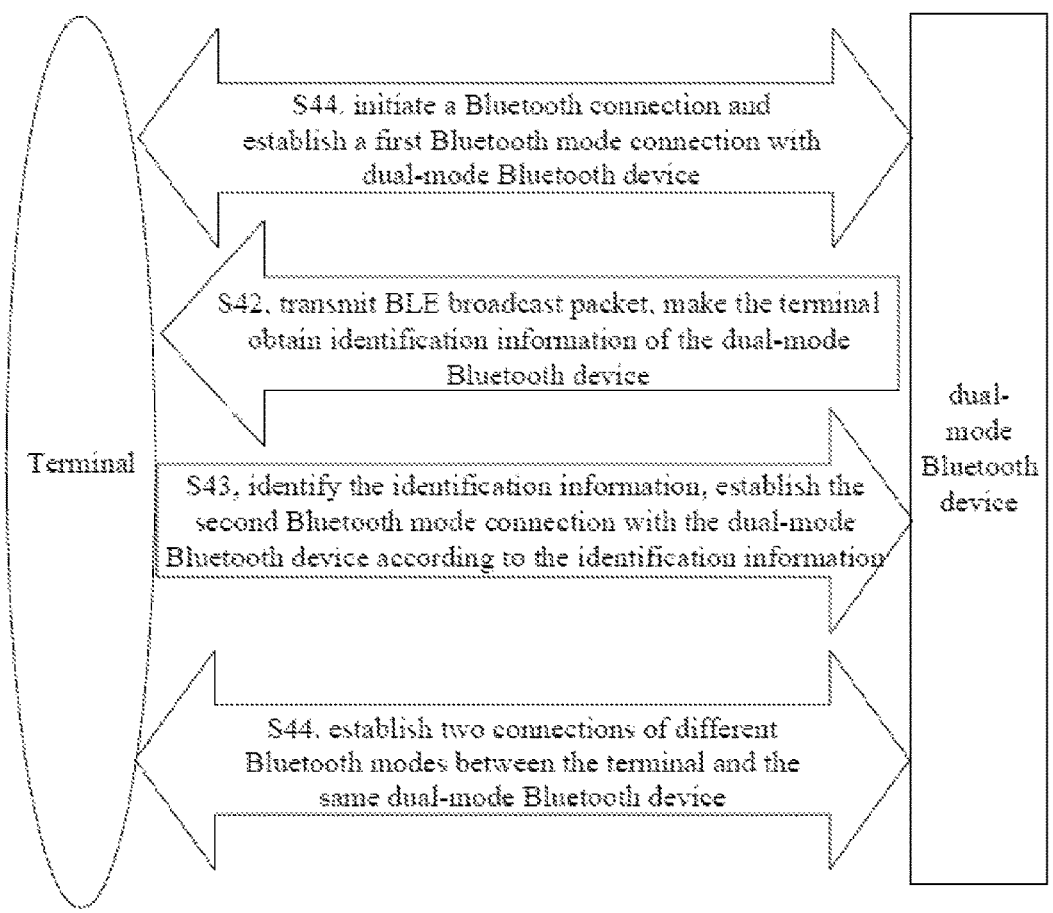
FIG. 4 is an interaction diagram of a Bluetooth connection method according to the embodiment 3 of the present application.

FIG. 4 is an interaction diagram of a Bluetooth connection method according to another embodiment of the present application, the detail description is as follows.

In Step S41, after the dual-mode Bluetooth device or the terminal initiates a Bluetooth connection they are connected to each other in the first Bluetooth mode; In Step S42 the dual-mode Bluetooth device transmits its own identification information to the terminal by transmitting BLE broadcast packet. In Step S43, after obtaining the identification information the terminal finds the initiator of the second Bluetooth mode that belongs to the same device as the first Bluetooth mode and then the connection of two devices is established so that two connections of different Bluetooth modes between the terminal and the same dual-mode Bluetooth device are established in Step S44. In this process, after the connection relationship in the first Bluetooth mode between the terminal device and the dual-mode Bluetooth device is established, the terminal device can accurately determines, according to the identification information of the connected dual-mode Bluetooth device, the relative information of the second Bluetooth mode which is enabled by the connected dual-mode Bluetooth device among many devices with the second Bluetooth mode enabled, thus two connections of different Bluetooth modes with the same dual-mode Bluetooth device are established and the misconnection can be avoided in the connection process.

Embodiment 4

Figure 5:
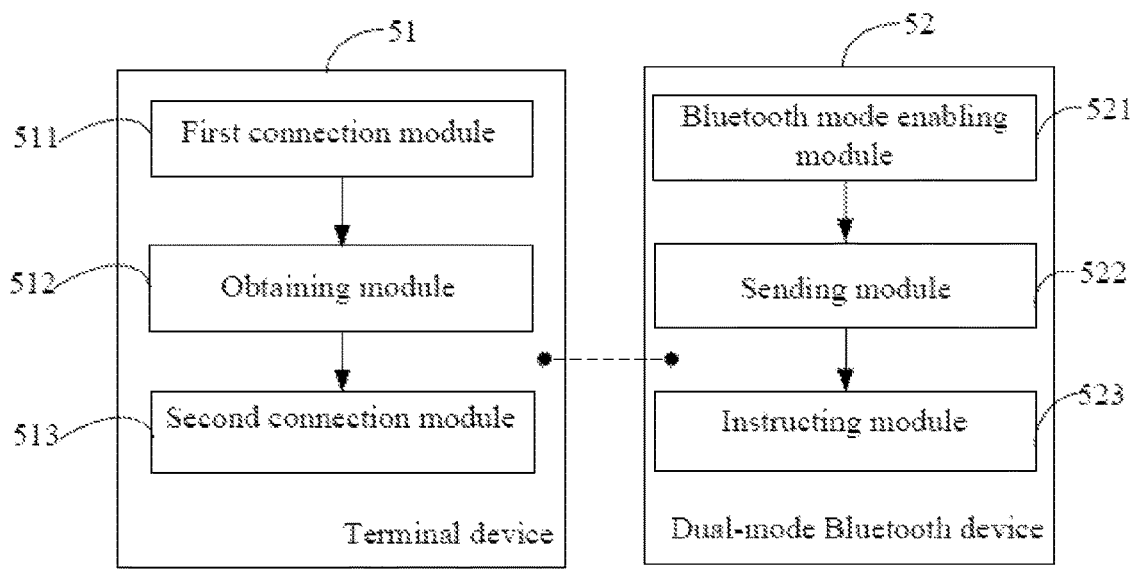
FIG. 5 is a schematic diagram of a Bluetooth connection device according to the embodiment 4 of the present application.

Corresponding to the Bluetooth connection method described in the foregoing embodiment, FIG. 5 is a structural block diagram of a Bluetooth connection device according to an embodiment of the present application. For the convenience of description, only parts related to the embodiment of the present application are shown.

Referring to FIG. 5, the Bluetooth connection device includes a terminal device 51 and a dual-mode Bluetooth device 52, where the terminal device 51 includes:

a first connection module 511, configured to make the terminal device search for a dual-mode Bluetooth device and establish a connection relationship in a first Bluetooth mode with the dual-mode Bluetooth device;

an obtaining module 512, configured to obtain identification information of the dual-mode Bluetooth device; and a second connection module 513, configured to establish a connection relationship in a second Bluetooth mode with the dual-mode Bluetooth device according to the identification information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

The dual-mode Bluetooth device 52 includes:

a Bluetooth mode enabling module 521, configured to enable the dual-mode Bluetooth device to establish the connection relationship in the first Bluetooth mode with the terminal device after a Bluetooth mode is enabled;

a sending module 522, configured to send the identification information of the dual-mode Bluetooth device to the terminal device; and an instructing module 523, configured to instructing the terminal device to establish the connection relationship in the second Bluetooth mode with the dual-mode Bluetooth device according to the identified information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

Further, the obtaining module 512 includes:

a broadcast packet sending unit, configured to obtain a broadcast packet sent from the dual-mode Bluetooth device in the Bluetooth Low Energy mode; and an identification information obtaining unit, configured to obtain the identification information of the dual-mode Bluetooth device according to the broadcast packet.

Further, when the first Bluetooth mode is the classic Bluetooth mode, the second connection module 513 includes:

a comparison unit, configured to obtain, according to the connected classic Bluetooth mode, the identification information of the dual-mode Bluetooth device and to determine whether the identification information of the dual-mode Bluetooth device is consistent with identification information obtained according to the broadcast packet by comparison; and a connection establishing unit configured to establish a connection relationship in the Bluetooth Low Energy mode with the dual-mode Bluetooth device when the identification information of the dual-mode Bluetooth device is consistent with identification information obtained according to the broadcast packet.

Further, when the first Bluetooth mode is the Bluetooth Low Energy mode, the second connection module 513 includes:

a calling unit, configured to call identifier information acquired according to the broadcast package;

a query unit, configured to search for an smart terminal having the same identification information as the identification information acquired according to the broadcast packet among smart terminals with the classic Bluetooth mode enabled, where the smart terminal is the dual-mode Bluetooth device, so as to establish the connection relationship in the classic Bluetooth mode with the dual-mode Bluetooth device.

Further, the identification information includes a name of the dual mode Bluetooth device or/and a classic Bluetooth address of the dual mode Bluetooth device in the classic Bluetooth mode.

It should be understood that, values of serial numbers of the steps in the above embodiments don't mean the execution sequence of the steps, the execution sequence of the steps should be determined by its function and internal logics, and should not be construed as limiting the implementation process of the embodiments of the present application.

Figure 6:
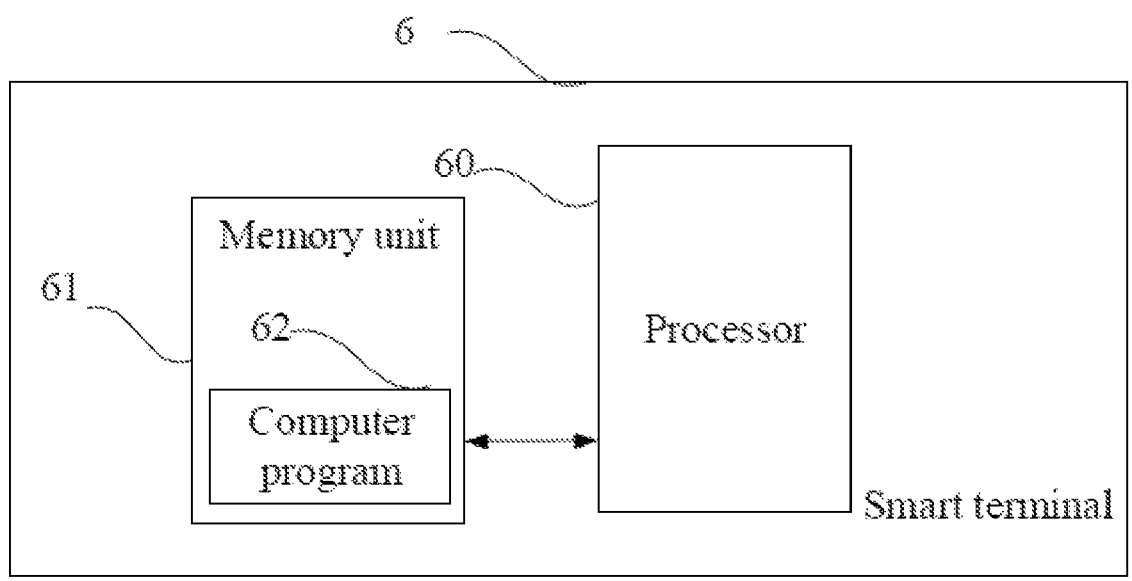
FIG. 6 is a schematic diagram of a smart terminal according to the embodiment 5 of the present application.

FIG. 6 is a schematic diagram of a smart terminal according to an embodiment of the present application. As shown in FIG. 6, the smart terminal 6 of this embodiment includes a processor 60, a memory 61, and a computer program 62 stored in the memory 61 and executable on the processor 60. When the processor 60 executes the computer program 62, the steps in the above embodiments of the respective Bluetooth connection methods, such as steps S21 to S23 shown in FIG. 2, are implemented. Alternatively, when the processor 60 executes the computer program 62, the functions of the modules/units in the foregoing device embodiments, such as the functions of the modules 511 to 513 and the modules 521 to 523 shown in FIG. 5, are implemented. For example, the computer program 62 can be divided into: a terminal device and a dual-mode Bluetooth device, where the terminal device includes:

a first connection module, configured to make the terminal device search for a dual-mode Bluetooth device and establish a connection relationship in a first Bluetooth mode with the dual-mode Bluetooth device;

an obtaining module, configured to obtain identification information of the dual-mode Bluetooth device; and a second connection module, configured to establish a connection relationship in a second Bluetooth mode with the dual-mode Bluetooth device according to the identification information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

The dual-mode Bluetooth device includes:

a Bluetooth mode enabling module, configured to enable the dual-mode Bluetooth device to establish the connection relationship in the first Bluetooth mode with the terminal device after a Bluetooth mode is enabled;

a sending module, configured to send the identification information of the dual-mode Bluetooth device to the terminal device; and an instructing module, configured to instructing the terminal device to establish the connection relationship in the second Bluetooth mode with the dual-mode Bluetooth device according to the identified information, where the first Bluetooth mode is one of the classic Bluetooth mode and the Bluetooth Low Energy mode of the dual-mode Bluetooth device, and the second Bluetooth mode is the other one of the classic Bluetooth mode and the Bluetooth Low Energy mode of the dual-mode Bluetooth device.

Further, the obtaining module includes:

a broadcast packet sending unit, configured to obtain a broadcast packet sent from the dual-mode Bluetooth device in the Bluetooth Low Energy mode; and an identification information obtaining unit, configured to obtain the identification information of the dual-mode Bluetooth device according to the broadcast packet.

Further, when the first Bluetooth mode is the classic Bluetooth mode, the second connection module includes:

a comparison unit, configured to obtain, according to the connected classic Bluetooth mode, the identification information of the dual-mode Bluetooth device and to determine whether the identification information of the dual-mode Bluetooth device is consistent with identification information obtained according to the broadcast packet by comparison; and a connection establishing unit configured to establish a connection relationship in the Bluetooth Low Energy mode with the dual-mode Bluetooth device when the identification information of the dual-mode Bluetooth device is consistent with identification information obtained according to the broadcast packet.

Further, when the first Bluetooth mode is the Bluetooth Low Energy mode, the second connection module includes:

a calling unit, configured to call identifier information acquired according to the broadcast package; and a query unit, configured to search for an smart terminal having the same identification information as the identification information acquired according to the broadcast packet among smart terminals with the classic Bluetooth mode enabled, where the smart terminal is the dual-mode Bluetooth device, so as to establish the connection relationship in the classic Bluetooth mode with the dual-mode Bluetooth device.

Further, the identification information includes a name of the dual mode Bluetooth device or/and a classic Bluetooth address of the dual mode Bluetooth device in the classic Bluetooth mode.

Exemplarily, the computer program 62 may be divided into one or a plurality of modules/units, the one or plurality of modules/units are stored in the storage device 61, and executed by the processor 60 so as to implement the present application. The one or plurality of modules/units may be a series of computer program instruction segments that can accomplish particular functionalities, these instruction segments are used for describing an executive process of the computer program 62 in the smart terminal 6.

The smart terminal may include, but is not limited to, the processor 60 and the memory 61. It will be understood by those skilled in the art that FIG. 6 is merely an example of the smart terminal 6, does not constitute a limitation of the smart terminal 6, may include more or less components than those illustrated, or may combine some components, or may include different components. For example, the smart terminal may further include an input/output device, a network access device, a bus, a display, and the like.

The processor 60 may be CPU (Central Processing Unit), and may alternatively be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, or alternatively, the processor may be any conventional processor and so on.

The memory 61 may be an internal storage unit of the smart terminal 6, such as a hard disk or an internal memory of the smart terminal 6. The memory 61 may alternatively be an external storage device of the smart terminal 6, such as a plug-in hard disk, a SMC (Smart Media Card), a SD (Secure Digital) card, a FC (Flash Card) equipped on the measuring device 10. Further, the memory 81 may include both the internal storage unit and the external storage device of the smart terminal 6. The memory 61 is configured to store the computer programs, and other procedures and data needed by the smart terminal 6 for determining wellbore cross-sectional shape. The memory 61 may also be configured to store data that has been output or being ready to be output temporarily.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

The ordinarily skilled one in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communication connection shown or discussed could be through some interfaces, and indirect coupling or communication connection between devices or units may be electrical, mechanical, or in other manners.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A Bluetooth connection method, comprising:
   searching, by a terminal device, for a dual-mode Bluetooth device, and establishing a connection relationship in a first Bluetooth mode with the dual-mode Bluetooth device;
   obtaining, by the terminal device, a broadcast packet sent from the dual-mode Bluetooth device in a Bluetooth Low Energy mode;
   obtaining, by the terminal device, identification information of the dual-mode Bluetooth device according to the broadcast packet sent from dual-mode Bluetooth device; and
   automatically establishing, by the terminal device, a stable connection relationship in a second Bluetooth mode with the dual-mode Bluetooth device according to the identification information of the dual-mode Bluetooth device when the dual-mode Bluetooth device is switched into the second Bluetooth mode, wherein the first Bluetooth mode is one of a classic Bluetooth mode and a Bluetooth Low Energy mode of the dual-mode Bluetooth device, and the second Bluetooth mode is the other one of the classic Bluetooth mode and the Bluetooth Low Energy mode of the dual-mode Bluetooth device,
   wherein the terminal device comprises:
   a first connection module, configured to make the terminal device search for a dual-mode Bluetooth device and establish a connection relationship in a first Bluetooth mode with the dual-mode Bluetooth device;
   an obtaining module, configured to obtain identification information of the dual-mode Bluetooth device; and
   a second connection module, configured to establish a connection relationship in a second Bluetooth mode with the dual-mode Bluetooth device according to the identification information,
   wherein, when the first Bluetooth mode is the classic Bluetooth mode, the second connection module comprises:
   a comparison unit, configured to obtain, according to the connected classic Bluetooth mode, the identification information of the dual-mode Bluetooth device and to determine whether the identification information of the dual-mode Bluetooth device is consistent with identification information obtained according to the broadcast packet by comparison; and
   a connection establishing unit configured to establish a connection relationship in the Bluetooth Low Energy mode with the dual-mode Bluetooth device when the identification information of the dual-mode Bluetooth device is consistent with identification information obtained according to the broadcast packet,
   wherein, when the first Bluetooth mode is the Bluetooth Low Energy mode, the second connection module comprises:
   a calling unit, configured to call identifier information acquired according to the broadcast package; and
   a query unit, configured to search for a smart terminal having the same identification information as the identification information acquired according to the broadcast packet among smart terminals with the classic Bluetooth mode enabled, where the smart terminal is the dual-mode Bluetooth device, so as to establish the connection relationship in the classic Bluetooth mode with the dual-mode Bluetooth device, and
   wherein the dual-mode Bluetooth device comprises:
   a Bluetooth mode enabling module, configured to enable the dual-mode Bluetooth device to establish the connection relationship in the first Bluetooth mode with the terminal device after a Bluetooth mode is enabled;
   a sending module, configured to send the identification information of the dual-mode Bluetooth device to the terminal device; and
   an instructing module, configured to instructing the terminal device to establish the connection relationship in the second Bluetooth mode with the dual-mode Bluetooth device according to the identified information.

2. The Bluetooth connection method according to claim 1, wherein when the first Bluetooth mode is the classic Bluetooth mode, the step of establishing a connection relationship in a second Bluetooth mode with the dual-mode Bluetooth device according to the identification information comprises:

searching for, among dual-mode Bluetooth devices with the Bluetooth Low Energy mode enabled, a dual-mode Bluetooth device having a same identification information as identification information obtained according to the broadcast packet as the dual-mode Bluetooth device; and establishing a connection relationship in the Bluetooth Low Energy mode with the dual-mode Bluetooth device.

3. The Bluetooth connection method according to claim 1, wherein when the first Bluetooth mode is the Bluetooth Low Energy mode, the step of establishing a connection relationship in a second Bluetooth mode with the dual-mode Bluetooth device according to the identification information comprising:

searching for, among dual-mode Bluetooth devices with the classic Bluetooth mode enabled, a dual-mode Bluetooth device having a same identification information as identification information obtained according to the broadcast packet as the dual-mode Bluetooth device; and establishing a connection relationship in the classic Bluetooth mode with the dual-mode Bluetooth device.

4. The Bluetooth connection method according to claim 1, wherein the identification information comprises:

a name of the dual-mode Bluetooth device or/and a classic Bluetooth address of the dual-mode Bluetooth device in the classic Bluetooth mode.

5. The Bluetooth connection method according to claim 1, wherein the dual-mode Bluetooth device supports a first application of the Bluetooth Low Energy mode, and the step of obtaining identification information of the dual-mode Bluetooth device, and establishing a connection relationship in a second Bluetooth mode with the dual-mode Bluetooth device according to the identification information comprises:

searching, by an APP for first application of Bluetooth Low Energy mode of the smart terminal, and according to at least one received Bluetooth broadcast packet, for a dual-mode Bluetooth device that has the second Bluetooth mode enabled and supports the first application of the Bluetooth Low Energy mode;

matching identification information of the searched dual-mode Bluetooth device with the identification information of the dual-mode Bluetooth device that has established the connection relationship in the first Bluetooth mode with the smart terminal; and establishing a connection relationship in the second Bluetooth mode with the matched dual-mode Bluetooth device.

6. The Bluetooth connection method according to claim 1, the obtaining module comprises:

a broadcast packet sending unit, configured to obtain a broadcast packet sent from the dual-mode Bluetooth device in the Bluetooth Low Energy mode; and an identification information obtaining unit, configured to obtain the identification information of the dual-mode Bluetooth device according to the broadcast packet.

7. A Bluetooth connection method, comprising:

establishing, by a dual-mode Bluetooth device, a connection relationship in a first Bluetooth mode with a terminal device, after a Bluetooth mode is enabled;

sending, by the dual-mode Bluetooth device in the Bluetooth Low Energy mode, a broadcast packet, the broadcast packet carrying identification information of the dual-mode Bluetooth device and the information indicating that the dual-mode Bluetooth device supports a first application of the Bluetooth Low Energy mode; and instructing the terminal device to automatically establish a stable connection relationship in the second Bluetooth mode with the dual-mode Bluetooth device according to the identification information of the dual-mode Bluetooth device when the dual-mode Bluetooth device is switched into the second Bluetooth mode, wherein the first Bluetooth mode is one of a classic Bluetooth mode and a Bluetooth Low Energy mode of the dual-mode Bluetooth device, and the second Bluetooth mode is the other one of the classic Bluetooth mode and the Bluetooth Low Energy mode of the dual-mode Bluetooth device, wherein the terminal device comprises:

a first connection module, configured to make the terminal device search for a dual-mode Bluetooth device and establish a connection relationship in a first Bluetooth mode with the dual-mode Bluetooth device;

an obtaining module, configured to obtain identification information of the dual-mode Bluetooth device; and a second connection module, configured to establish a connection relationship in a second Bluetooth mode with the dual-mode Bluetooth device according to the identification information, wherein, when the first Bluetooth mode is the classic Bluetooth mode, the second connection module comprises:

a comparison unit, configured to obtain, according to the connected classic Bluetooth mode, the identification information of the dual-mode Bluetooth device and to determine whether the identification information of the dual-mode Bluetooth device is consistent with identification information obtained according to the broadcast packet by comparison; and a connection establishing unit configured to establish a connection relationship in the Bluetooth Low Energy mode with the dual-mode Bluetooth device when the identification information of the dual-mode Bluetooth device is consistent with identification information obtained according to the broadcast packet;

wherein, when the first Bluetooth mode is the Bluetooth Low Energy mode, the second connection module comprises:

a calling unit, configured to call identifier information acquired according to the broadcast package; and a query unit, configured to search for an smart terminal having the same identification information as the identification information acquired according to the broadcast packet among smart terminals with the classic Bluetooth mode enabled, where the smart terminal is the dual-mode Bluetooth device, so as to establish the connection relationship in the classic Bluetooth mode with the dual-mode Bluetooth device, and wherein the dual-mode Bluetooth device comprises:

a Bluetooth mode enabling module, configured to enable the dual-mode Bluetooth device to establish the connection relationship in the first Bluetooth mode with the terminal device after a Bluetooth mode is enabled;

a sending module, configured to send the identification information of the dual-mode Bluetooth device to the terminal device; and an instructing module, configured to instructing the terminal device to establish the connection relationship in the second Bluetooth mode with the dual-mode Bluetooth device according to the identified information.

8. The method according to claim 7, wherein the first application of the Bluetooth Low Energy mode includes heart rate detection.

9. The method according to claim 7, wherein the dual-mode Bluetooth device includes a smart wearable device and/or a heart rate monitor.

10. The method according to claim 7, wherein the dual-mode Bluetooth device supports phone call, music play and heart rate transmission functions.

11. The method according to claim 7, the obtaining module comprises:
a broadcast packet sending unit, configured to obtain a broadcast packet sent from the dual-mode Bluetooth device in the Bluetooth Low Energy mode; and
an identification information obtaining unit, configured to obtain the identification information of the dual-mode Bluetooth device according to the broadcast packet.

12. A Bluetooth system comprising a smart terminal, the smart terminal comprises a first memory, a first processor, and a first computer program stored in the first memory and executable in the first processor, wherein the first processor is configured to execute the first computer program to implement a first Bluetooth connection method which comprises:
searching, by a terminal device, for a dual-mode Bluetooth device and establishing a connection relationship in a first Bluetooth mode with the dual-mode Bluetooth device;
obtaining, by the terminal device, a broadcast packet sent from the dual-mode Bluetooth device in a Bluetooth Low Energy mode;
obtaining, by the terminal device, identification information of the dual-mode Bluetooth device according to the broadcast packet sent from dual-mode Bluetooth device; and
automatically establishing, by the terminal device, a stable connection relationship in a second Bluetooth mode with the dual-mode Bluetooth device according to the identification information of the dual-mode Bluetooth device when the dual-mode Bluetooth device is switched into the second Bluetooth mode, wherein the first Bluetooth mode is one of a classic Bluetooth mode and a Bluetooth Low Energy mode of the dual-mode Bluetooth device, and the second Bluetooth mode is the other one of the classic Bluetooth mode and the Bluetooth Low Energy mode of the dual-mode Bluetooth device,
wherein the terminal device comprises:
a first connection module, configured to make the terminal device search for a dual-mode Bluetooth device and establish a connection relationship in a first Bluetooth mode with the dual-mode Bluetooth device;
an obtaining module, configured to obtain identification information of the dual-mode Bluetooth device; and a second connection module, configured to establish a connection relationship in a second Bluetooth mode with the dual-mode Bluetooth device according to the identification information, wherein, when the first Bluetooth mode is the classic Bluetooth mode, the second connection module comprises:
a comparison unit, configured to obtain, according to the connected classic Bluetooth mode, the identification information of the dual-mode Bluetooth device and to determine whether the identification information of the dual-mode Bluetooth device is consistent with identification information obtained according to the broadcast packet by comparison; and
a connection establishing unit configured to establish a connection relationship in the Bluetooth Low Energy mode with the dual-mode Bluetooth device when the identification information of the dual-mode Bluetooth device is consistent with identification information obtained according to the broadcast packet;

wherein, when the first Bluetooth mode is the Bluetooth Low Energy mode, the second connection module comprises:
a calling unit, configured to call identifier information acquired according to the broadcast package; and
a query unit, configured to search for an smart terminal having the same identification information as the identification information acquired according to the broadcast packet among smart terminals with the classic Bluetooth mode enabled, where the smart terminal is the dual-mode Bluetooth device, so as to establish the connection relationship in the classic Bluetooth mode with the dual-mode Bluetooth device, wherein the dual-mode Bluetooth device comprises:
a Bluetooth mode enabling module, configured to enable the dual-mode Bluetooth device to establish the connection relationship in the first Bluetooth mode with the terminal device after a Bluetooth mode is enabled;
a sending module, configured to send the identification information of the dual-mode Bluetooth device to the terminal device; and
an instructing module, configured to instructing the terminal device to establish the connection relationship in the second Bluetooth mode with the dual-mode Bluetooth device according to the identified information.

13. The Bluetooth system according to claim 12, wherein when the first Bluetooth mode is the classic Bluetooth mode, the step of establishing a connection relationship in a second Bluetooth mode with the dual-mode Bluetooth device according to the identification information comprises:
searching for, among dual-mode Bluetooth devices with the Bluetooth Low Energy mode enabled, a dual-mode Bluetooth device having a same identification information as identification information obtained according to the broadcast packet as the dual-mode Bluetooth device; and
establishing a connection relationship in the Bluetooth Low Energy mode with the dual-mode Bluetooth device.

14. The Bluetooth system according to claim 12, wherein when the first Bluetooth mode is the Bluetooth Low Energy mode, the step of establishing a connection relationship in a second Bluetooth mode with the dual-mode Bluetooth device according to the identification information comprising:
- searching for, among dual-mode Bluetooth devices with the classic Bluetooth mode enabled, a dual-mode Bluetooth device having a same identification information as identification information obtained according to the broadcast packet as the dual-mode Bluetooth device; and
- establishing a connection relationship in the classic Bluetooth mode with the dual-mode Bluetooth device.

15. The Bluetooth system according to claim 12, wherein the identification information comprises:
- a name of the dual-mode Bluetooth device or/and a classic Bluetooth address of the dual-mode Bluetooth device in the classic Bluetooth mode.

16. The Bluetooth system according to claim 12, wherein the dual-mode Bluetooth device supports a first application of the Bluetooth Low Energy mode, and the step of obtaining identification information of the dual-mode Bluetooth device, and establishing a connection relationship in a second Bluetooth mode with the dual-mode Bluetooth device according to the identification information comprises:
- searching, by an APP for the first application of the Bluetooth Low Energy mode of the smart terminal, according to at least one received Bluetooth broadcast packet, a dual-mode Bluetooth device that has the second Bluetooth mode enabled and supports the first application of the Bluetooth Low Energy mode;
- matching identification information of the searched dual-mode Bluetooth device with the identification information of the dual-mode Bluetooth device that has established the connection relationship in the first Bluetooth mode with the smart terminal; and
- establishing a connection relationship in the second Bluetooth mode with the matched dual-mode Bluetooth device.

17. The Bluetooth system according to claim 12, wherein the Bluetooth system further comprises the dual-mode Bluetooth device which comprises a second memory, a second processor, and a second computer program stored in the second memory and executable on the second processor, wherein second first processor is configured to execute the second computer program to implement steps of a second Bluetooth connection method comprising:
- establishing, by the dual-mode Bluetooth device, a connection relationship in a first Bluetooth mode with a terminal device after a Bluetooth mode is enabled; and
- sending, by the dual-mode Bluetooth device, the identification information of the dual-mode Bluetooth device so that the terminal device establishes a connection relationship in the second Bluetooth mode with the dual-mode Bluetooth device according to the identification information.

18. The Bluetooth system according to claim 17, the step of sending identification information of the dual-mode Bluetooth device to the terminal device comprising:
- sending, by the dual-mode Bluetooth device in the Bluetooth Low Energy mode, a broadcast packet, the broadcast packet carrying identification information of the dual-mode Bluetooth device and information indicating that the dual-mode Bluetooth device supports a first application of the Bluetooth Low Energy mode.

19. The Bluetooth system according to claim 12, wherein the dual-mode Bluetooth device supports phone call, music play and heart rate transmission functions.

20. The Bluetooth system according to claim 12, the obtaining module comprises:
- a broadcast packet sending unit, configured to obtain a broadcast packet sent from the dual-mode Bluetooth device in the Bluetooth Low Energy mode; and
- an identification information obtaining unit, configured to obtain the identification information of the dual-mode Bluetooth device according to the broadcast packet.

\* \* \* \* \*